United States Patent [19]

Elleaume

[11] Patent Number: 4,772,889
[45] Date of Patent: Sep. 20, 1988

[54] DEVICE FOR CALCULATING A DISCRETE FOURIER TRANSFORM AND ITS APPLICATION TO PULSE COMPRESSION IN A RADAR SYSTEM

[75] Inventor: Philippe Elleaume, Antony, France

[73] Assignee: Thomson-CSF, Paris, France

[21] Appl. No.: 919,163

[22] Filed: Oct. 15, 1986

[30] Foreign Application Priority Data

Oct. 16, 1985 [FR] France ............................ 85 15310

[51] Int. Cl.$^4$ .............................................. G01S 7/44
[52] U.S. Cl. .................................. 342/194; 342/196; 342/201
[58] Field of Search ............... 364/726; 342/196, 194, 342/201

[56] References Cited

U.S. PATENT DOCUMENTS 3,778,606 12/1973 Schmitt et al. ...................... 364/726
4,093,994 6/1978 Nussbaumer ....................... 364/726
4,591,857 5/1986 Thor ............................. 342/196 X

OTHER PUBLICATIONS

Dillard, "Recursive Computation of the Discrete Fourier Transform with Applications to an FSK Communication Receiver," IEEE National Televommunication Conference, Institute of Electrical and Electronics Engineers, San Diego, Dec. 2-4, 1974, pp. 263-265.

Primary Examiner—T. H. Tubbesing
Assistant Examiner—Gilberto Barrón, Jr.
Attorney, Agent, or Firm—Pollock, VandeSande & Priddy

[57] ABSTRACT

A device for calculating a discrete, moving window and non-recurrent Fourier transform, especially applicable to the processing of a pulse compression radar signal. The device includes N stages which, on the basis of samples of the input signal, each give a signal of the form:

$$X_k{}^m = X'_k{}^m \cdot \exp\left( j \cdot 2\pi \cdot \frac{m \cdot k}{N} \right) \quad (1)$$

with:

$$X'^{m+1}_k = X'_k{}^m + x'_{m+N} - x'_m \quad (2)$$

$$x'_m = x_m \cdot \exp\left( -j \cdot 2\pi \cdot \frac{m \cdot k}{N} \right) \quad (3)$$

where k is the index of the stage ($0<k<N$), m the index of the window and N the number of samples in the window, N being a multiple of four. The complex rotations of the expressions (1) and (3) are each broken down into a rotation in the first quadrant of the complex plane, a rotation common to N stages and a supplementary rotation specific to each stage, achieved by addition-subtraction.

10 Claims, 7 Drawing Sheets

DEVICE FOR CALCULATING A DISCRETE FOURIER TRANSFORM AND ITS APPLICATION TO PULSE COMPRESSION IN A RADAR SYSTEM

FIELD OF THE INVENTION

The invention is a device to calculate a discrete and moving window Fourier transform, i.e. a discrete Fourier transform applied to a signal along a moving (or shifting) temporal window.

The invention also comprises application of this calculating device to a pulse compression radar system.

Cross-Reference to Related Applications

Reference is made to the following co-pending U.S. patent applications of the inventor, both of which are assigned to the assignee of this application:

U.S. Ser. No. 878,891, filed June 26, 1986, now U.S. Pat. No. 4,723,125 and

U.S. Ser. No. 910,578, filed Sept. 23, 1986.

BACKGROUND OF THE INVENTION

Numerous applications in the prior art are based on the calculation of Fourier transforms, among them the filtering operations performed in a radar system on the received signal. Moreover, current technical developments include a search for digital methods of carrying out these operations. In this search, one of the difficulties pertains to the necessary calculating capacity. This problem is especially acute in applications such as radar systems where the calculations have to be made in real time.

SUMMARY OF THE INVENTION

The invention is a device for calculation of discrete Fourier transforms, on a shifting temporal window, making it possible to minimize the number of operations. Another object of the invention is to remove the influence of the degree of calculating precision achieved at each stage. Contributing to this result is use of a calculating process which eliminates errors due to any recursive nature, a process that we shall call "non-recurrent" for purposes of simplification. Further contributing to the results is the operation of breaking down complex rotations that have to be performed and, thus, reducing their number.

According to the invention, there is provided a device comprising N stages which, on the basis of input signal samples (x), each give a signal (X) of the shape:

$$X_k{}^m = X'_k{}^m \cdot \exp\left( j \cdot 2\pi \cdot \frac{m \cdot k}{N} \right) \quad (1)$$

with:

$$X'^{m+1}_k = X'_k{}^m + x'_{m+N} - x'_m \quad (2)$$

$$x'_m = x_m \cdot \exp\left( -j \cdot 2\pi \cdot \frac{m \cdot k}{N} \right) \quad (3)$$

where k is the index of the stage (0<k<N), m the index of the window and N the number of samples in the window. At least one of the above complex multiplications of the form $$\exp\left( j \cdot 2\pi \cdot \frac{m.k}{N} \right),$$

that of the expression (3), which is a rotation in the complex plane, is broken down into a rotation in the first quadrant of the complex plane, common to N stages, and an additional rotation specific to each stage, the additional rotation is implemented by addition-subtraction.

The invention also comprises application of this device for pulse compression in a radar signal processing chain.

BRIEF DESCRIPTION OF THE DRAWINGS

Other objects, specific features and results of the invention will be seen from the following description, given as a non-exhaustive example and illustrated by the appended drawings wherein.

In the various figures the same references are applied to the same elements.

DESCRIPTION OF THE PREFERRED EMBODIMENT

Before going into a detailed description of the figures depicting the embodiment of the calculating device according to the invention, we shall briefly recapitulate the discrete Fourier transform (DFT).

It may be recalled that the DFT is used to make a set of N frequency components $X_k$ correspond to N samples of a temporally varying signal x(t), with k varying from 0 to N−1. If $x_n$ is used to designate the sample of the order of n ($0 \leq n \leq N-1$) of the signal x(t), the sampling being done with a period $\tau$ and on a temporal window of a duration T, with T=N$\tau$, the correspondence has the form:

$$X_k = \sum_{n=0}^{N-1} x_n \cdot \exp\left( -j \cdot 2\pi \cdot \frac{k \cdot n}{N} \right),$$

The reverse transform being written, as is known:

$$x_n = \sum_{k=0}^{N-1} X_k \cdot \exp\left( +j \cdot 2\pi \cdot \frac{k \cdot n}{N} \right)$$

When a Fourier transform of this type, with a signal x(t), is sought to be applied to a temporal window of N points shifting in time, we get the following expression for the components X, for a window with an index m:

$$X_k^m = \sum_{n=0}^{N-1} x_{m+n} \cdot \exp\left( -j \cdot 2\pi \cdot \frac{k \cdot n}{N} \right) \quad (4)$$

It appears that the calculation of these components requires numerous operations and therefore, substantial calculating capacity. As indicated above, the problem is all the more acute as these calculations must be done in real time for certain applications such as radar systems.

Calculations made by the applicant have shown that the necessary operations were partly redundant. The applicant has developed a calculating algorithm which minimizes the number of operations needed. This algorithm is used to obtain the term $X_k^{m+1}$ on the basis of the sample $x_m$ of the signal and of the previously calculated term ($X_k^m$) in the following way:

$$X_k^{m+1} = \{X_k^m + x_{m+N} - x_m\} \cdot \exp\left( +j \cdot 2\pi \cdot \frac{k}{N} \right) \quad (5)$$

By starting from the above expression and applying it to a window that has shifted by one sampling period (window with an index of m+1), we get:

$$X_k^{m+1} = \sum_{n=0}^{N-1} x_{m+1+n} \cdot \exp\left( -j \cdot 2\pi \cdot \frac{k \cdot n}{N} \right)$$

The variable is changed according to:

$$n' = n + 1$$

whence:

$$X_k^{m+1} = \sum_{n'=1}^{N} x_{m+n'} \cdot \exp\left( -j \cdot 2\pi \cdot \frac{k \cdot (n'-1)}{N} \right)$$

or again:

$$X_k^{m+1} = \left( \sum_{n'=1}^{N} x_{m+n'} \cdot \exp\left( -j \cdot 2\pi \cdot \frac{k \cdot n'}{N} \right) \right) \cdot$$

$$\exp\left( +j \cdot 2\pi \cdot \frac{k}{N} \right)$$

$$= \sum_{n'=0}^{N-1} x_{m+n'} \cdot \exp\left( -j \cdot 2\pi \cdot \frac{k \cdot n'}{N} \right) -$$

$$x_m \cdot \exp\left( -j \cdot 2\pi \cdot \frac{k \cdot 0}{N} \right) +$$

$$x_{m+N} \cdot \exp\left( -j \cdot 2\pi \cdot \frac{k \cdot N}{N} \right) \cdot$$

$$\exp\left( +j \cdot 2\pi \cdot \frac{k}{N} \right)$$

$$= \{X_k^m + x_{m+N} - x_m\} \cdot \exp\left( +j \cdot 2\pi \cdot \frac{k}{N} \right)$$

which is the above expression (5).

An expression of this kind is of the recurrent type, i.e. the (m+1)th value of the quantity $x_k^{m+1}$ depends on the value obtained for the preceding quantity $X_k^m$.

In certain cases it may be preferable to be free from the need for calculating precision at each stage.

Calculations done by the applicant show that the above expression (5) may be expressed in the form of the following system of equations, referred to earlier:

$$X_k^m = X'_k^m \cdot \exp\left( j \cdot 2\pi \cdot \frac{m \cdot k}{N} \right) \quad (1)$$

$$X'_k^{m+1} = X'_k^m + x'_{m+N} - x'_m \quad (2)$$

$$x'_m = x_m \cdot \exp\left( -j \cdot 2\pi \cdot \frac{m \cdot k}{N} \right) \quad (3)$$

For the following change of variable can be made in the expression (5):

$$X'_k^m = X_k^m \cdot \exp\left( -j \cdot 2\pi \cdot \frac{m \cdot k}{N} \right)$$

that is, inversely:

$$X_k^m = X'_k^m \cdot \exp\left( +j \cdot 2\pi \cdot \frac{m \cdot k}{N} \right),$$

which is the above equation (1).

Applying this to the expression (5), we get:

$$X'_k^{m+1} \cdot \exp\left( j \cdot 2\pi \cdot \frac{(m+1)k}{N} \right) = \left[ X^{25} \begin{array}{l} \text{for each of stages} \\ (0 \ldots k \ldots N-1) \end{array} \right] \cdot$$

$$\exp\left( j \cdot 2\pi \cdot \frac{k}{N} \right)$$

or again:

$$X'^{m+1}_k = X'^m_k + x_{m+N} \cdot \exp\left(-j \cdot 2\pi \cdot \frac{m \cdot k}{N}\right) - x_m.$$

$$\exp\left(-j \cdot 2\pi \cdot \frac{m \cdot k}{N}\right)$$

If we assume the following change in variable:

$$x'_m = x_m \cdot \exp\left(-j \cdot 2\pi \cdot \frac{m \cdot k}{N}\right),$$

which is the equation (3) above, we again find the following expression, which is equation (2) above:

$$X'^{m+1}_k = X'^m_k + x'_{m+N} - x'_m$$

Thus, it would appear that all the equations (1), (2) and (3) form a new expression of the shifting DFT wherein there is no longer any error introduced by recurrence.

In the expression (5), all the factors, and especially the input sample ($x_{m+N}$) and the output sample ($x_n$) of the window are multiplied by the complex exponential function $$\left(\exp \cdot \left(j \cdot 2\pi \cdot \frac{k}{N}\right)\right)$$

which we do not know how to calculate exactly in practice. By contrast, in the expression (2), which is the only expression of the system of equations (1) to (3) of the recurrent type, the "input" term ($x'_{m+N}$) and the "output" term ($x'_m$) are independent of the preceding complex exponential function, and their value, once obtained, remains constant throughout the time of passage of the window, thus eliminating effects of error in their calculation. Consequently, even though the process is always recurrent, there is no longer any error introduced by the recursive nature when this process is carried out. For this reason, this process is here called "non-recurrent" for the sake of simplicity.

Figure 1:
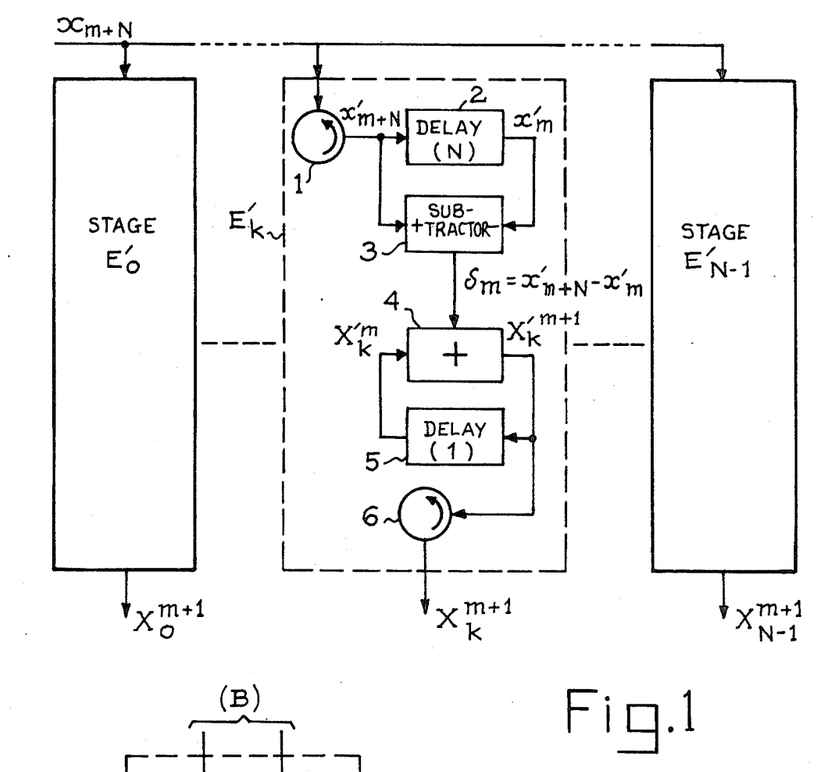
FIG. 1 is a block diagram of a Fourier transform calculating device.

FIG. 1 represents a device that calculates a "non-recurrent" shifting DFT as defined by the equations (1), (2) and (3).

FIG. 1 shows a set of N stages with references $E'_0 \ldots E'_k \ldots E'_{N-1}$, each of which receives a sample $x_{m+N}$ of the signal $x(t)$ for which a Fourier transformation is sought. Each of the stages gives an output signal $X^{m+1}$, bearing the index ($0 \ldots k \ldots N-1$) of the stage.

The various stages E' are identical. The construction of one of the stages, with an index k, is depicted.

Each stage comprises a complex rotation operator 1 which receives the sample $x_{m+N}$ and which generates an output signal $x'_{m+N}$ as defined by equation (3). This latter signal is coupled to a subtractor 3 firstly, directly at the positive input of this subtractor and, secondly, at the negative input of this subtractor through a delay circuit 2. The circuit 2 delays the signal $x'_{m+N}$ by N sampling periods. The output signal of the circuit 2 is then written $x'_m$. The delay circuit 2 is implemented for example by a shift register with N stages. The output signal of the subtractor 3, then takes the form $\delta_m = x'_{m+N} - x'_m$, is coupled to an adder 4. The adder 4 also receives its own output signal as calculated in the previous step, i.e. the output of the adder 4 is linked to its input by means of a delay circuit 5 which delays the adder output signal by one period τ. This output signal of the adder 4 is the signal $X'^{m+1}_k$ as defined by the equation (2). This output signal of the adder 4 is moreover coupled to a second complex rotation operator, reference 6, which from its input signal $X'^{m+1}_k$, to generates the signal $X^{m+1}_k$ as defined by the equation (1) above implementing a complex rotation $$\exp\left(j \cdot 2\pi \cdot k \frac{m+1}{k}\right).$$

It must be noted that when the device of FIG. 1 is initialized, and the first sample ($x_0$) is received, the operators and registers should all be set at zero.

When the number of stages E' becomes large, reasons related to calculating capacity, as explained earlier, make it desirable to reduce the number of operations.

Figure 2:
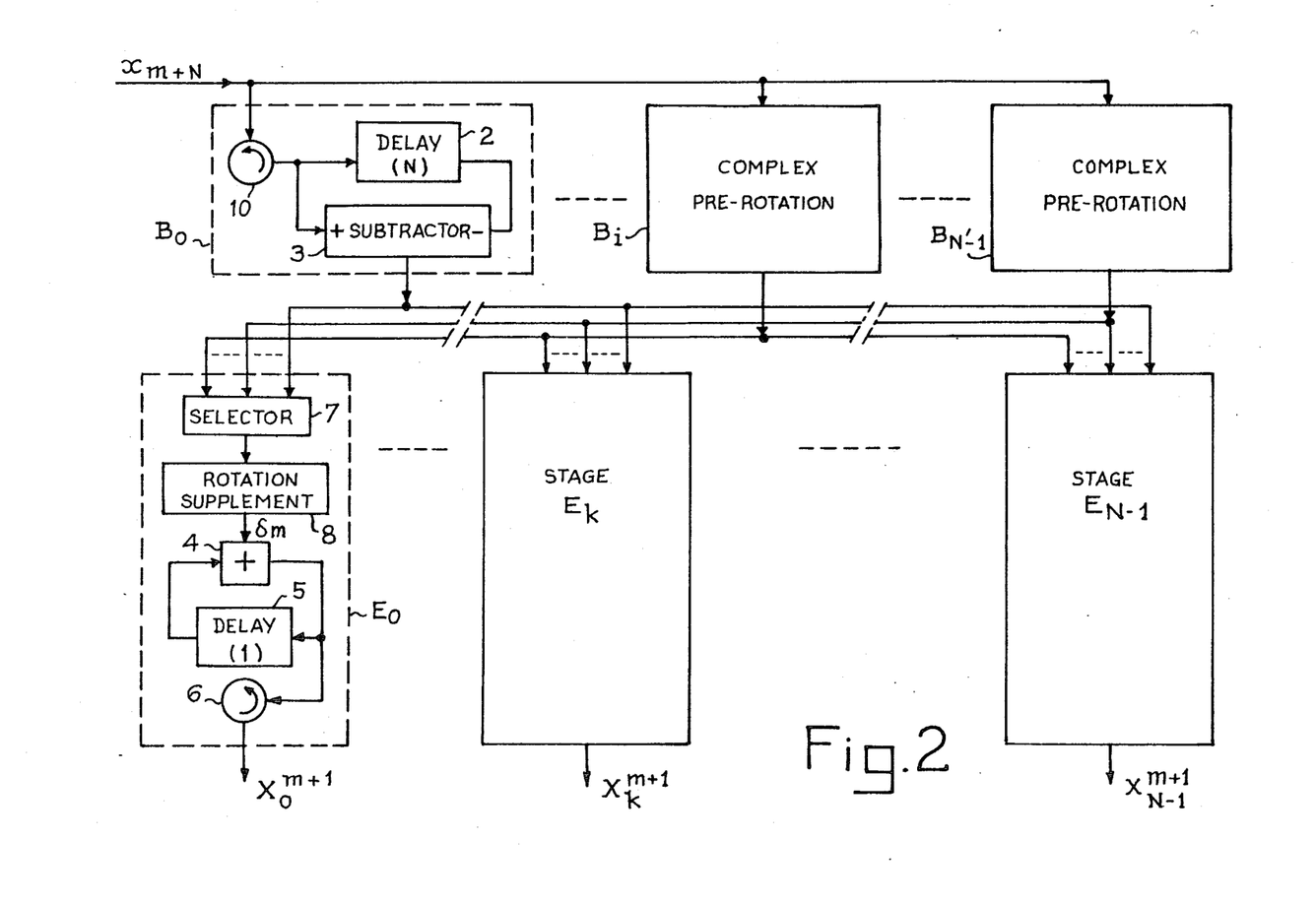
FIG. 2 is a block diagram of the calculating device according to the invention.

According to the invention, this number of operations is diminished by selecting a multiple of 4 for N and by breaking down the complex rotation performed by the operator 1 into a first rotation in the first quadrant of the complex plane. This first rotation is performed in a way that is common to all the stages. Thereafter, there is an additional rotation for each stage equal to zero, once, twice or thrice times π/2, always in the complex plane. This structure is depicted in FIG. 2 described below.

The rotations performed by the operator 1 of FIG. 1, like those of the operator 6, have the following form:

$$\exp\left(j \cdot 2\pi \cdot \frac{p}{N}\right).$$

In this expression p is equal to k.m in the case of the operator 1, except for the sign.

According to the invention, all possible values of rotation in the first quadrant are calculated, i.e. for all the values of p (written p') from 0 to N' with N'=N/4. To obtain the values corresponding to the other quadrants of the complex plane, we multiply by the following quantities:

(1) When p belongs to the second quadrant ($N' \leq P \leq 2N'$), we can write:

$$p = p' + N' \text{ with } 0 \leq p' \leq N' \text{ and } N' = N/4 \quad (7)$$

whence:

$$\exp\left(j \cdot 2\pi \cdot \frac{p}{N}\right) = \exp\left(j \cdot 2\pi \cdot \frac{p' + N'}{4N'}\right)$$

$$= \exp\left(j \cdot \frac{\pi}{2}\right) \cdot \exp\left(j \cdot 2\pi \cdot \frac{p'}{N'}\right)$$

$$= j \cdot \exp\left(j \cdot 2\pi \cdot \frac{p'}{N'}\right)$$

It would therefore appear that in this case, the initial rotation is reduced to a rotation in the first quadrant supplemented by a multiplication by j, which can be done simply by an exchange between the real part and the imaginary part of the data on which the rotation is made;

(2) Similarly, if the number p ranges from 2N' to 3N', leading to a complex rotation located in the third quadrant, the expression (6) above is reduced to the following expression:

$$\exp\left\{j \cdot 2\pi \frac{p}{N}\right\} = -\exp\left\{j \cdot 2\pi \cdot \frac{p'}{N'}\right\} \quad (8)$$

i.e. to a change in sign;

(3) Similarly, when the number p leads to a complex rotation in the fourth quadrant, i.e. p ranging from 3N' to 4N', we get:

$$\exp\left\{j \cdot 2\pi \cdot \frac{p}{N}\right\} = -j \cdot \exp\left\{j \cdot 2\pi \cdot \frac{p'}{N'}\right\} \quad (9)$$

i.e. a change in sign and an exchange between the real and imaginary parts.

Hence, in the diagram of FIG. 2, the complex rotation made by the operator 1 (hereinafter called pre-rotation in contrast to the rotation performed by the operator 6, called post-rotation) has been broken down, in each of the stages in FIG. 1, into a pre-rotation common to all the stages (blocks B in FIG. 2) and an additional pre-rotation which is performed in a manner specific to each of the stages.

More precisely, the part common to all the stages comprises as many blocks B, written $B_0 \ldots B_i \ldots B_{N'-1}$, as there are values possible for p' (we may recall that $0 \leq p' < N'-1$). Each of the blocks $B_i$ therefore comprises a complex rotating operator 10, which is similar to the operator 1 of FIG. 1 but performs the complex rotation:

$$\exp\left\{j \cdot 2\pi \cdot \frac{p'}{N'}\right\}$$

on the sample $x_{m+N}$ for p'=i. Given that the following operations have a delay of N periods (block 2 in FIG. 1) and a subtraction (block 3) and that these operations do not imply any phase shift (for we have:

$$\exp\left\{j \cdot 2\pi \cdot \frac{k \cdot m}{N}\right\} \equiv \exp\left\{j \cdot 2\pi \cdot \frac{k(m+N)}{N}\right\}),$$

the blocks 2 and 3 are integrated into each of the blocks B, common to all the stages E.

Each of the stages now identified with references E comprises the elements 4, 5 and 6 described in FIG. 1 with, however, an additional upstream operator 8 performing the additional pre-rotation specific to each stage. The operator 8 is preceded by a selector 7 used to select those complex pre-rotations, performed by the blocks B, which suit the stage under consideration. The selectors 7, for example, are implemented by means of multiplexers controlled by a sequencer which sequences the operations of the entire device. The operator 8 performs the additional rotation by any means, known to the prior art, to change a sign or to invert the real and the imaginary part as shown by the equations (7), (8) and (9).

Figure 3:
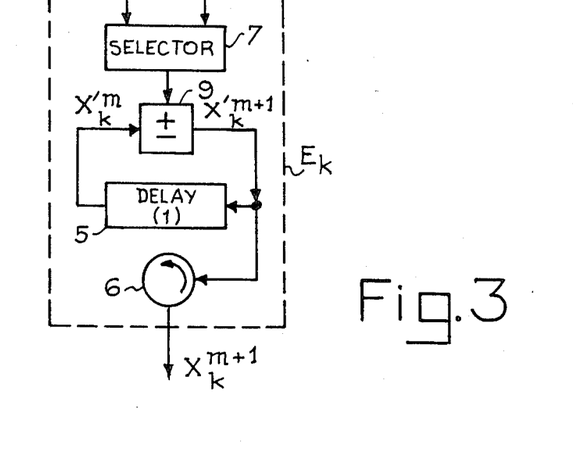
FIG. 3 is a variant embodiment of the preceding figure.

FIG. 3 represents an alternative embodiment of the stages E wherein the calculation of the additional pre-rotation operations (operator 8 in FIG. 2) and the addition performed in the adder 4 are combined and performed by an adder-subtractor 9 which takes the place of the adder 4 and operator 8.

The additional pre-rotation ($\phi$) has only four possible values: 0, $\pi/2$, $\pi$ or $3\pi/2$. If the complex magnitudes to be added, $\delta_m$ and $X'^m_k$ are, represented by their real and imaginary parts in the following manner:

$$\delta_m = a + jb$$

$$X'^m_k = A^m + jB^m,$$

the magnitude of the output $X'^{m+1}_k$ of adder subtractor 9 is written in the same way:

$$X'^{m+1}_k = A^{m+1} + jB^{m+1}.$$

We then get, for the different values of $\phi$, one of four cases:

(1) for $\phi = 0$, the real and imaginary parts of $\delta_m$ and $X'^m_k$ respectively are added, giving:

$$X'^{m+1}_k \begin{cases} A^{m+1} = A^m + a \\ B^{m+1} = B^m + b \end{cases}$$

(2) for $\phi = \pi/2$ the real and imaginary parts of $\delta_m$ and $X'^m_k$ are exchanged with a chance of sign:

$$X'^{m+1}_k \begin{cases} A^{m+1} = A^m - b \\ B^{m+1} = B^m + a \end{cases}$$

(3) for $\phi = \pi$, the signs are changed:

$$X'^{m+1}_k \begin{cases} A^{m+1} = A^m - a \\ B^{m+1} = B^m - b \end{cases}$$

(4) finally, for $\phi = 3\pi/2$, the real and imaginary parts are exchanged again with a change of sign:

$$X'^{m+1}_k \begin{cases} A^{m+1} = A^m + b \\ B^{m+1} = B^m - a \end{cases}$$

Figure 4:
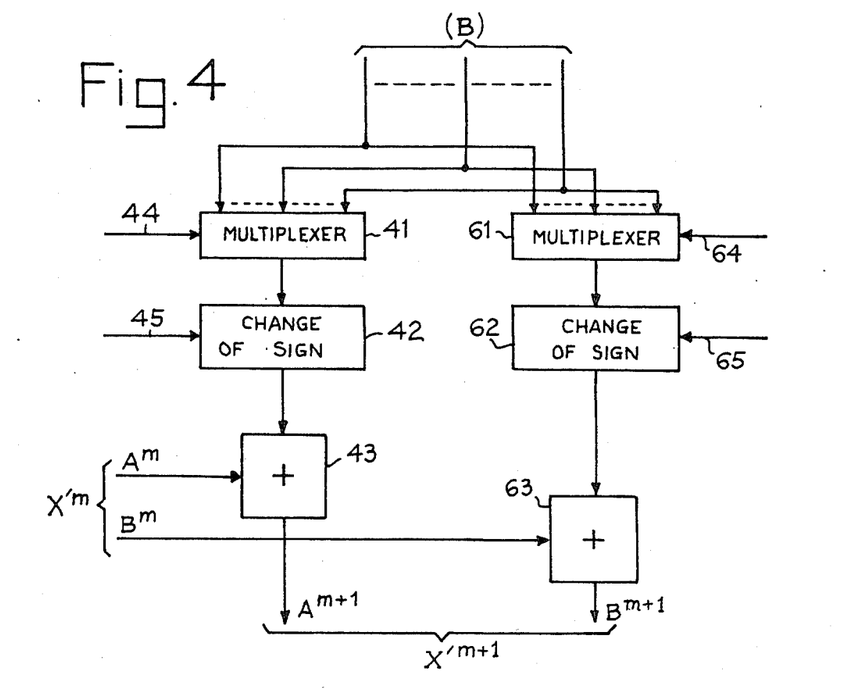
FIG. 4 is an embodiment of a part of the preceding figure.

By way of example, FIG. 4 depicts a practical embodiment of the selector 7 and 9 of FIG. 3.

In this example, there are two series of three analog elements, 41 to 43 and 61 to 63 which respectively process the real and imaginary parts of the data output by the blocks B and the signal $X'^m$.

In all the circuits described by way of example, complex data are expressed in the real part/imaginary part form, either in parallel (as in FIG. 4), or serially.

The signals from the blocks B are therefore input, in parallel, to two multiplexers 41 and 61 which, depending on the current index of the sample x (controls 44 and 64 of the sequencer of the device), each select a value from among the two N' values received (N' real parts and N' imaginary parts).

The adder-subtractor 9 of FIG. 3 is split into a sign-changing device (42, 62) followed by an adder (43, 63). The devices 42 and 62, if necessary, change the value of the signs (real or imaginary respectively) associated with the data that they process depending on the supplementary rotation to be made for the respective stages. A command 45, 65 to this effect is directed to the sign changing devices by the sequencer. The adders 43 and 63 then add the signals input the devices 42 and 62 to the values of $X'_m$ ($A^m$ and $B^m$) to give the real part ($A^{m+1}$) and the imaginary part ($B^{m+1}$) of $X'^{m+1}$.

Figure 5:
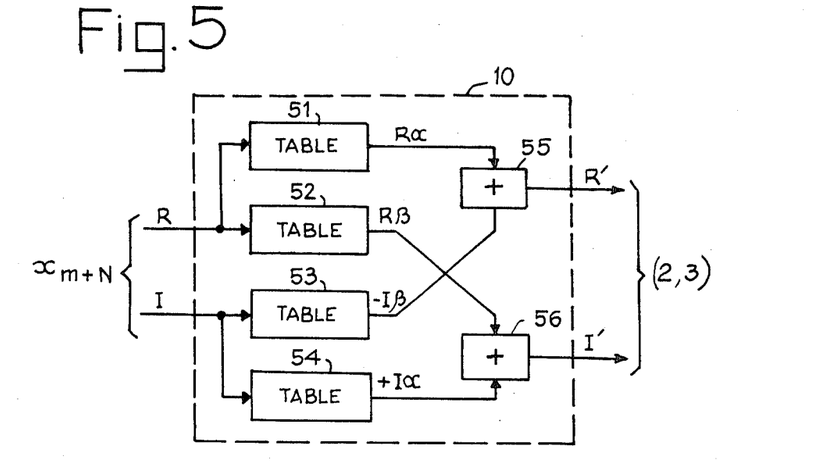
FIG. 5 is a diagrammatic embodiment of one of the operators used in the preceding figures.

FIG. 5 depicts an example of a practical embodiment of the complex rotation operators such as the operator 10 of FIG. 2.

The input data $x_{m+N}$ of the operator 10 is represented distinctly by its real part and its imaginary part which are respectively written R and I.

Performing a complex rotation, $\exp\{-j.2\pi.p'\}$ on a complex data R+JI amounts to calculating the product:

$$(R+jI).(\alpha+j\beta),$$

If $\alpha$ and $\beta$ are the real and imaginary parts of the expression $$\exp\left\{-j\cdot 2\pi\frac{p'}{N'}\right\},$$

the development of the product shows that it is equivalent to:

$$(R\alpha-I\beta)+j(R\beta+I\alpha)$$

FIG. 5 depicts the operator 10 performing the latter operation.

This operator comprises four memories 51-54, for example of the ROM type, of which 51,52 receive the data R and 53,54 receive the data I. These memories, respectively, output the quantities $R\alpha$, $R\beta$, $-I\beta$ and $I\alpha$. $R\alpha$ and $-I\beta$ are added in an adder 55 to form the real part R' of the data and output towards the delay circuit 2 and subtractor 3 (FIG. 2). $R\beta$ and $I\alpha$ are added in an adder 56 to form the imaginary part I' directed towards the delay circuit 2 and subtractor 3.

In an alternative embodiment, it is possible to use only two memories and a single adder. Upon an external command, these memories initially provide the data $R\alpha$ and $-I\beta$ which, when added, form the real part R'. During a second step, the memories provide the other two data ($R\beta$ and $I\alpha$) which are added in turn to give I'.

The operator 6 of FIG. 2 can be implemented in a similar way on condition that the "plus" sign of the exponential function is taken into account when constituting the table and that, furthermore, each table is provided with an input for commands from the sequencer, giving the value of m+1 (modulo N).

As stated above, a calculating device such as the one described in FIG. 1, may be used in a pulse compression radar processing chain to form a matched filter.

It will be recalled that optimum processing for a signal and noise is to pass the signal and noise through a filter matched to the signal, i.e. a filter of which the transmittance is the conjugate of the said signal's spectrum.

It will also be recalled that pulse compression is a process aimed at improving the distance resolution power of a radar while, at the same time, providing for a long pulse duration T. This process consists in providing a dispersive (in terms of frequency) line on the radar-transmitting chain, the effect of which is to lengthen (or "dilate") the signal, and in compensating for this effect at reception, i.e. in compressing the received signal. In practice, for reasons of resistance to the Doppler effect, a chirp, i.e. a linear modulation of frequency, is often used. The problem that arises then at reception is to make a filter which is suited to the chirp in question. This problem is considered below.

Furthermore, when digital methods are used, the objective is often to achieve an approximation of the chirp so that the chirp approximation makes subsequent adaptive filtering operation easier. A form of this approximation is known under the name of Frank code. It will be recalled that the term "code" refers to a signal, the characteristics of which may vary with time, this variation being a deterministic or psuedo-random one (known to the transmitter). It will also be recalled that Frank's approximation is written:

$$x(t)=\exp\{j.2\pi.f(t).t\}$$

where:
.t$\in$[0; T];
.f$\in$[0; B] and $$f(t) = \frac{k(t)}{N} \cdot B;$$

.B is the frequency band of the signal x(t).

Figure 6:
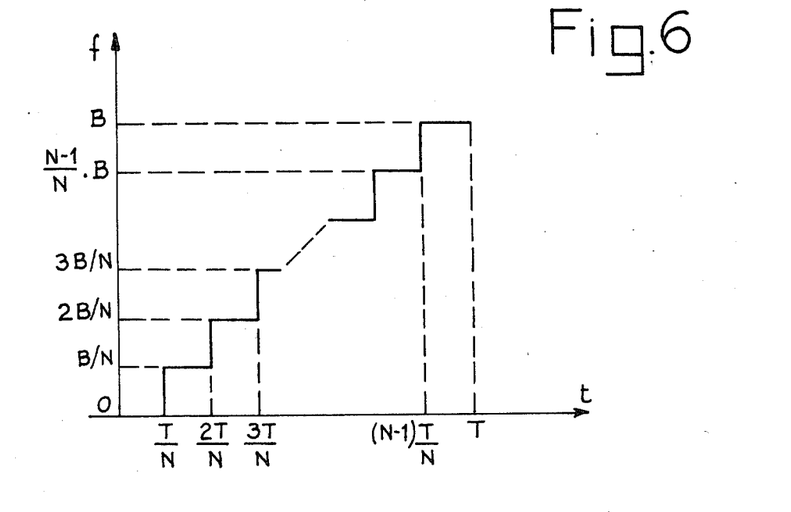
FIG. 6 is an explanatory graph.

The signal x(t) thus has the shape shown in FIG. 6, i.e. one series of N steps extending in time for a duration T. Each step or level of the order of i is characterized by a frequency iB/N and a duration T/N.

With the preceding notations, we choose:

$$BT = N^2$$

$$f_e = B \longleftrightarrow \tau = \frac{1}{B},$$

resulting in a whole number of complex sinusoidal signals per level, the various levels being, therefore, linked to one another without any jump in phase. Furthermore, since we have N levels, we have N samples per level.

The prior art knows how to establish the matched filtering of Frank codes by means of Fast Fourier Transform (FFT) algorithms by assuming N=2q, which leads to:

$$B.T=(2q)^2;$$

for FFT algorithms are more specially suited to powers of 2.

However, in this case, the number of permitted compression rates is limited (it will be recalled that the compression rate is given by the product B.T). For example, for integer N ranging from 1 to 16, the only permitted compression rates are 1, 4, 16, 64 and 256. This is a disadvantage, mainly for the following two reasons:

(1) Being restricted to a few precise values of the product BT is irksome because each of the parameters B and T cannot be chosen freely. The duration T is conditioned by the power and range desired for the radar while the frequency band B is conditioned by the desired resolution.

(2) The divergence between the possible compression rates is very great for high values of the product BT whereas, in certain applications (such as multiple-mode radars), the goal is to make these parameters vary more finely.

According to the invention, to make a filter matched to each level, we use shifting DFTs such as those defined by the expressions (1), (2) and (3) above. We shall show below that the discrete and shifting Fourier transform is the filter adapted to a signal formed by a whole number of complex sinusoidal signals.

Take a signal x(t) made up of a whole number of complex sinusoidal signals;

$$x(t) = \exp\{j.2\pi.f.t\}$$

with:
.t∈[0;T]
$f = k.(1/T)$

If we choose a sampling frequency $f_e$ such that: $f_e = N.(1/T)$ (with $N > k_{max}$), we can write the sampled signal x'(t) in the form;

$$x'(t) = \sum_{n=0}^{N-1} x_n \cdot \delta(t - n\tau) \qquad (10)$$

where:
.δ is the Dirac function;
.τ is the sampling period ($\tau = 1/f_e$);
.$x_n$ is the signal x(t) sampled at the nth sampling period (τ):

$$x_n = \exp\{j \cdot 2\pi \cdot f \cdot n \cdot \tau\} \qquad (11)$$
$$= \exp\left(j \cdot 2\pi \cdot \frac{k \cdot n}{N}\right)$$

The transmittance H(f) of the filter adapted to the sampled signal x'(t) is the conjugate complex of the spectrum X'(f) of this signal:

$$H(f) = \overline{X'(f)}$$

or, in the temporal field:

$$h(f) = \overline{x'(-t)}, \qquad (12)$$

h(t) being the Fourier transform of the transmittance H(f).

From the expressions (10), (11) and (12), we deduce:

$$h(t) = \sum_{n=0}^{N-1} \exp\left(-j \cdot 2\pi \cdot \frac{k \cdot n}{N}\right) \cdot \delta(-t - n\tau) \qquad (13)$$

If we apply a signal e(t) to a filter, the response of which is given by the expression (13), a signal s(t) is obtained at the filter output, defined by:

$$s(t) = h(t) * e(t)$$

where the sign * represents a convolution, i.e.:

$$s(t) = \int_{-\infty}^{+\infty} e(t - u) \cdot h(u) \cdot du$$

by replacing h(u) in this latter expression by its value given By the expression (13), we obtain:

$$s(t) = \sum_{n=0}^{N-1} \left( \int_{-\infty}^{+\infty} e(t - u) \cdot \delta(-u - n\tau) \cdot du \right) \cdot$$
$$\exp\left(-j \cdot 2\pi \cdot \frac{k \cdot n}{N}\right)$$
$$= \sum_{n=0}^{N-1} e(t + n\tau) \cdot \exp\left(-j \cdot 2\pi \cdot \frac{k \cdot n}{N}\right)$$

If we consider solely the output signal after sampling, i.e. s(m), written $s_m$, we get:

$$s_m = \sum_{n=0}^{N-1} e_{m+n} \cdot \exp\left(-j \cdot 2\pi \cdot \frac{k \cdot n}{N}\right)$$

This expression has the same form as the above expression (4), i.e. the output signal (s) is obtained by setting up a shifting DFT at the input signal (e).

According to the invention, we therefore set up a pulse compression in a radar chain using the device described in FIG. 2.

Figure 7:
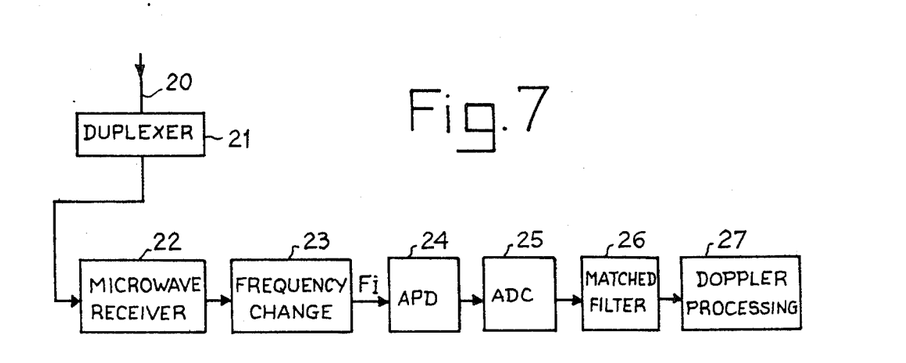
FIG. 7 is the block diagram of a radar receiver and of a related signal processing chain.

FIG. 7 gives a schematic recapitulation of the construction of a pulse compression radar signal receiving and processing chain into which the device of the invention is capable of being introduced.

The radar signal is received at an antenna 20 and it is directed, by means of a duplexer 21, to the receiver part of the radar.

This receiver part comprises the following main cascade-connected elements:

A microwave receiver 22;

A set of frequency-changing circuits 23 used to transpose the microwave received signal into an intermediate frequency (IF);

An amplitude and phase demodulator (APD) 24;

An analog-to-digital converter (ADC) 25 which digitizes the radar signal;

An adaptive filter 26;

A set of circuits 27 performing Doppler processing operations, if necessary.

It should be noted that the matched filter 26 may be inserted after the Doppler processing circuits 27 in the chain, if necessary. Similarly, when the demodulator 24 is digital, it can be placed at any point of the chain, of course after the analog to digital converter 25.

According to the invention, the matched filter 26 is a device for calculating a shifting DFT such as the one defined by the equations (1), (2) and (3) when the transmitted signal is a linear frequency chirp in which the product BT is equal to the square of a whole number ($N^2$). The advantage of this is that it reduces complex preliminary multiplications, if N is a multiple of four.

Figure 8:
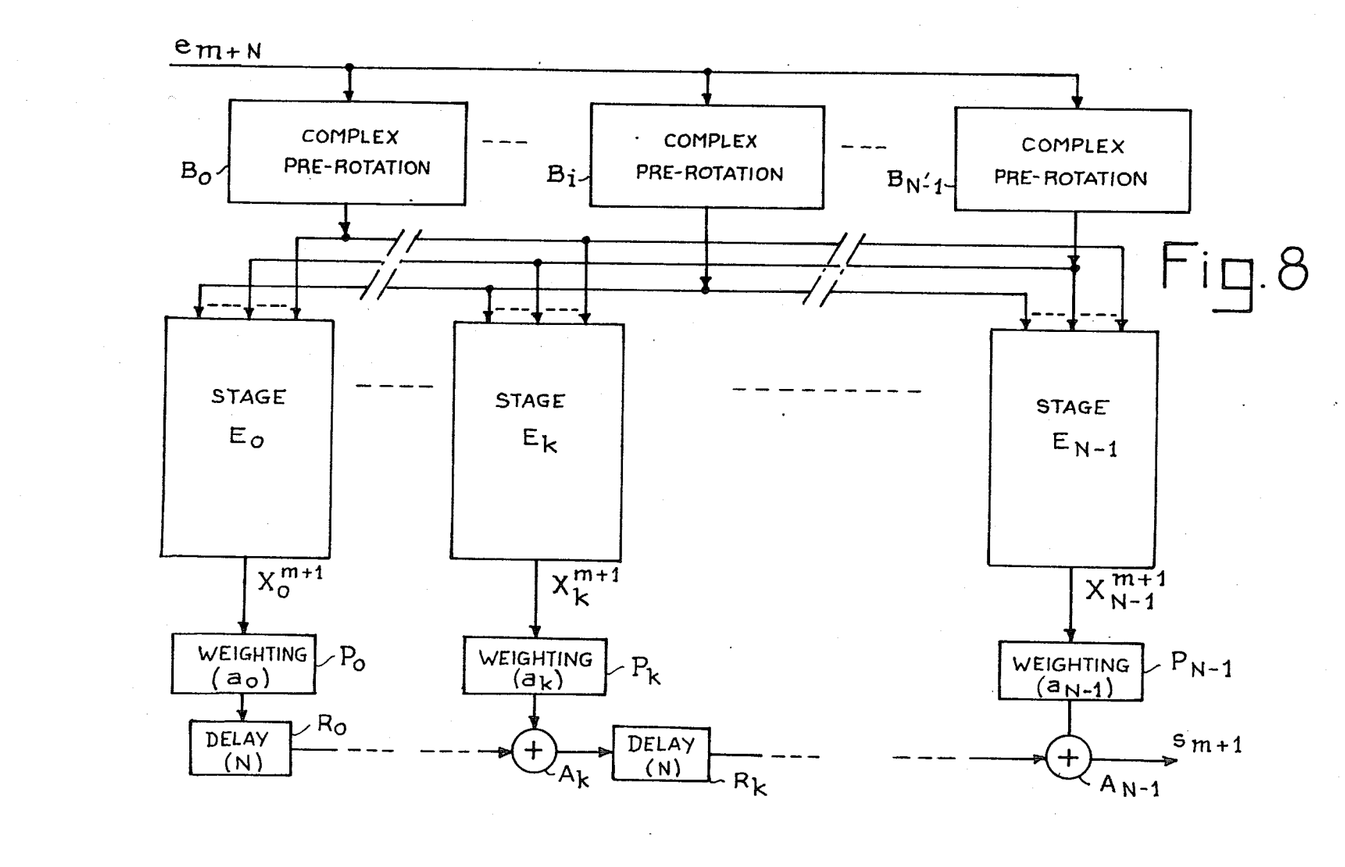
FIG. 8 is a diagram of the application of the device according to the invention to pulse compression in a radar signal processing chain.

FIG. 8 depicts an embodiment of this filter.

FIG. 8 reproduces the N' complex pre-rotation blocks B, each of which is parallel-connected to N stages E. The stage $E_k$ gives the quantity $X_k^{m+1}$ at its output. The stages E are each made up as shown in FIG. 2 or 3.

Each of the quantities $X_k^{m+1}$ is added (by an adder $A_k$) to the preceding quantity $X_{k-1}^{m+1}$ after having undergone a delay of $R_k = N$ sampling periods. The addition is done until the final stage $E_{N-1}$ produces the output signal $s_{m+1}$.

The introduction of a delay of N periods into each stage E is made necessary by the fact that, with the system of FIG. 8, the initial points of all the N levels which are separated from one another by N sampling periods are calculated simultaneously. To obtain the signal s, it is therefore necessary to make corrections. Of course, correction is necessary only where N levels are transmitted in succession. If they are transmitted simultaneously, the delays $R_k$ are no longer necessary.

Furthermore, in the mode of the embodiment of FIG. 8, a weighting device $P_k$ is inserted between the output of the stage $E_k$ and the adder $A_k$. This is an optional amplitude weighting, the purpose of which is to lower the level of the minor lobes. However, weighting process causes losses because it entails diverging from the theoretical adaptive filter.

Figure 9:
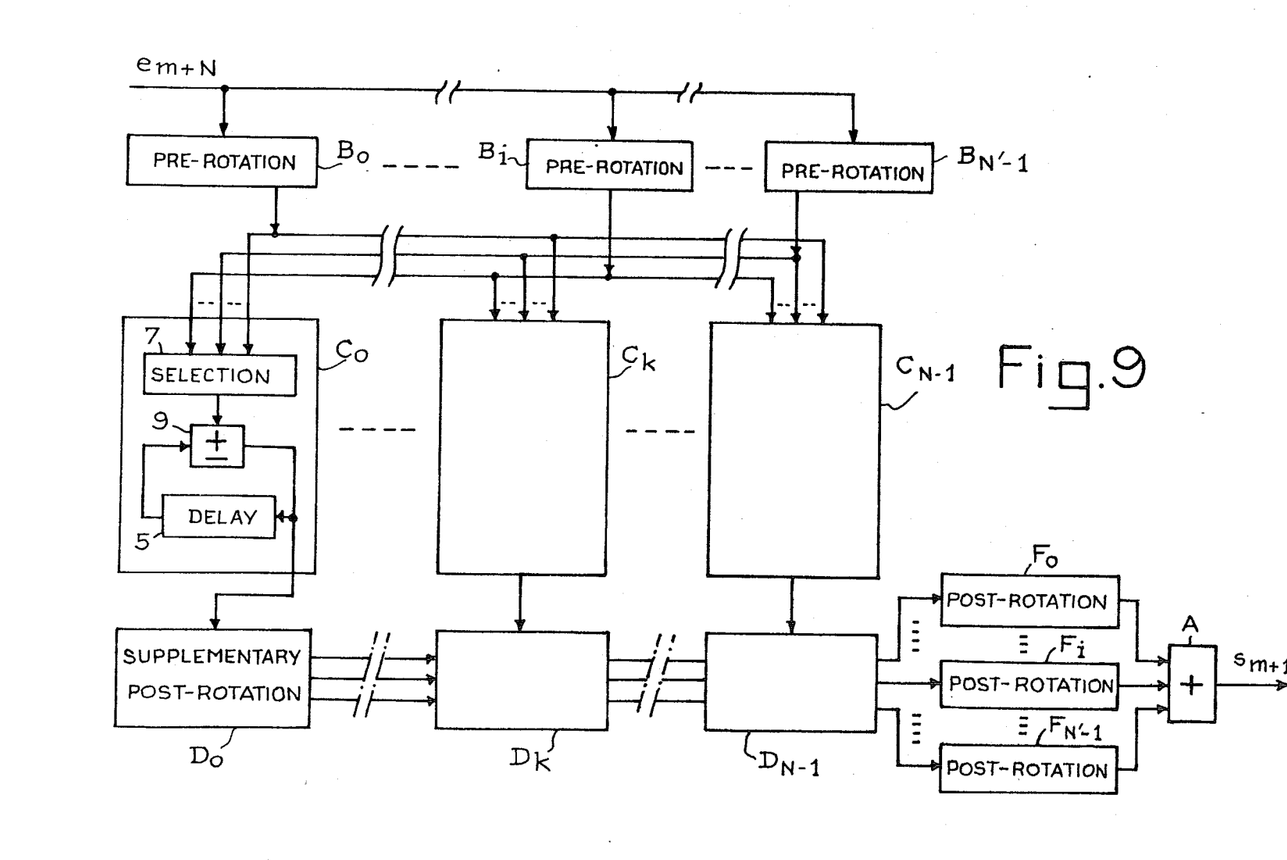
FIG. 9 is a variant embodiment of the preceding figure.

FIG. 9 depicts an alternative embodiment of the filter of FIG. 8 in which the required number of complex rotation operators is even further reduced. This is done by eliminating the operator 6 of FIG. 2, of each stage (we may recall that this operator performs a complex post-rotation as defined in the expression (1)), and by replacing it, in a manner similar to the operation performed with the complex pre-rotation blocks B, through a complex post-rotation performed in the first quadrant of the complex plane only, supplemented by an additional post-rotation done for each of the stages E. This supplementary post-rotation is preferably done at the same time as the addition $A_k$ in a manner similar to that described for pre-rotation in FIG. 3.

FIG. 9, therefore, reproduces the N complex pre-rotation blocks B which feed the N stages in parallel. These stages are broken down into two parts:

One part marked C, with the same elements as the stages E apart from the post-rotation 6, i.e. the selector 7, adder-subtractor 9 and operator circuit 5 of FIG. 3 as depicted in FIG. 9, or the selector 7, operator circuit 8, adder 4 and circuit 5 of FIG. 2.

One part marked D which performs the supplementary post-rotation specific to each stage and, adjoining it, in a preferred embodiment, the addition $A_K$ and the delay $R_k$.

The outputs of the stages are directed towards N' post-rotation operators, identified by references $F_o \ldots F_i \ldots F_{N'-1}$ which are similar to the operator 10. The outputs of these operators are added (adder A) to give the output signal $S_{m+1}$.

Figure 10:
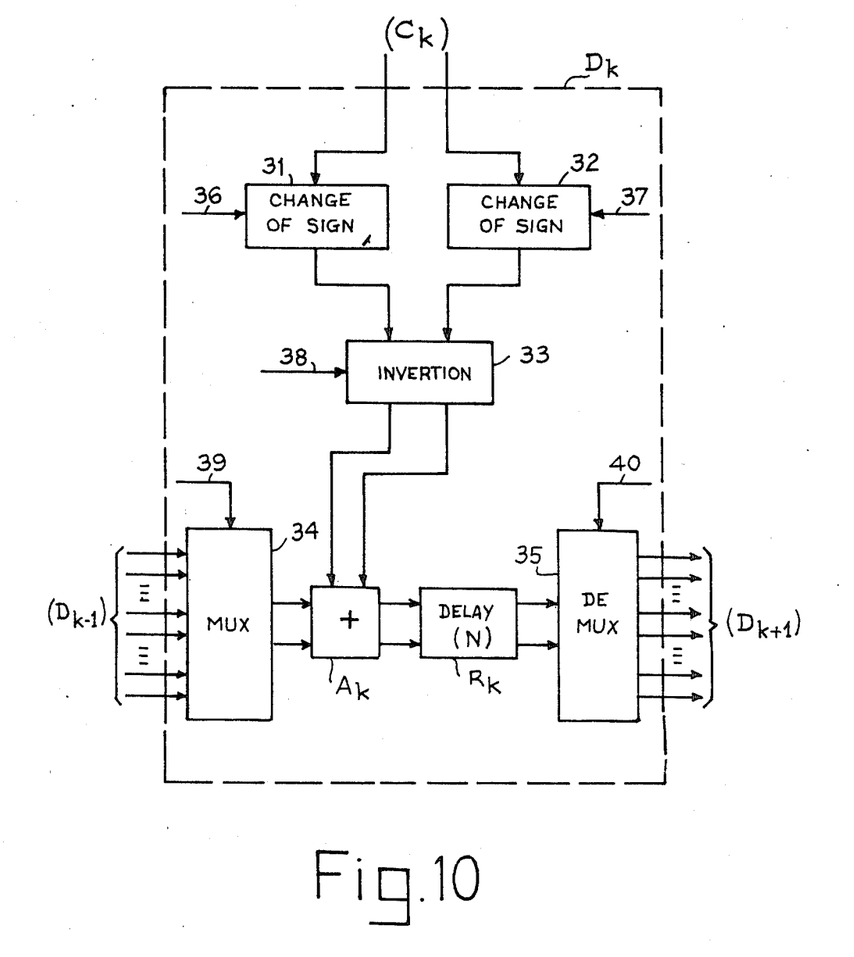
FIG. 10 is an example of a practical embodiment of a part of the preceding figure.

FIG. 10 depicts an example of a practical embodiment of the part D of each stage, for example, the part $D_k$.

The supplementary post-rotation to be provided at each stage, with respect to the post-rotation performed in the first quadrant by the blocks F (FIG. 9), is done here as explained earlier for the supplementary pre-rotation. More precisely, if necessary, a sign is changed or a real part/imaginary part exchange (or inversion) is made of the complex magnitude given by the part $C_k$ of the stage before addition to the complex magnitude given by the preceding stage ($D_{k-1}$).

To this end, the block $D_k$ comprises two sign-changing devices 31 and 32 which respectively receive the real part and the imaginary part of the data given by the block $C_k$. Whether the sign is changed or not depends upon a command (36 or 37) from the sequencer.

The outputs of the sign changing devices 31 and 32 are linked to an inversion device 33 which, if necessary, makes the real part/imaginary part exchange or inversion upon a command (38) from the sequencer.

Furthermore, the block $D_k$ receives the real part and the imaginary part of the complex data, elaborated by the previous stages, at a multiplexer 34. These parts are distributed in a bus with N'×2 connections, N' being the number of distinct values of post-rotations to be done (blocks F FIG. 9). Upon a command (39) from the sequencer, the multiplexer 34 gives the real part and the imaginary part of the data to be added (adder $A_k$) to the value of the stage of the order k considered.

The result of the addition is delayed (delay $R_k$). Then, by means of a demultiplexer 35 which is also controlled by the sequencer (command 40), this result is delivered to a bus (identical to the input bus) with N'×2 connections for the following stage ($D_{k+1}$).

Of course, the block $D_o$ differs from the block $D_k$ in that it does not require the multiplexer 34 and adder $A_k$. The block $D_{n-1}$ does not require the delay element $R_k$.

It must be noted that, in the preceding description, the work is done in the frequency band [0;B]. However, since the sampling is done at the frequency $f_e=B$, the entire operation is modulo B. Consequently, it is possible to operate in the same way in any frequency band with a width B. More particularly, the following band may be chosen:

$$f \in \left[ -\frac{B}{2}; +\frac{B}{2} \right]$$

This leads to X components of negative frequency. However, since it is known that:

$$\exp\left( j \cdot 2\pi \cdot k \frac{N}{N} \right) = 1 \, k,$$

it is obvious that $X_{-k} \equiv X_{N-k}$, a fact that leads to X components of positive frequency.

What is claimed is:

1. A device for calculating a discrete Fourier transform (DFT) on a moving temporal window of a duration T, providing N components ($X^{m+1}$) of said DFT using N samples ($x_{m+N}$) of an input signal from which it is sought to calculate said DFT, wherein N is an integer chosen to be a multiple of four, said device comprising:

N stages, each supplying one of said components defined by:

$$X_k^m = X'^m_k \cdot \exp\left( j \cdot 2\pi \cdot \frac{m \cdot k}{N} \right) \quad (1)$$

with:

$$X'^{m+1}_k = X'^m_k + x'_{m+N} - x'_m \quad (2)$$

$$x'_m = x_m \cdot \exp\left( -j \cdot 2\pi \cdot \frac{m \cdot k}{N} \right) \quad (3)$$

where k is an index of the stage, with $0 \leq k < N$, and m is an index of said window;

first means for performing a complex rotation required by equation (3), in a pre-rotation operation solely in a first quadrant of a complex plane and a supplementary prerotation corresponding to an integer number of quadrants, said first means including:

N' complex pre-rotation means with N'=N/4, each said complex pre-rotation means comprising a first complex rotation operator receiving said samples and performing a rotation in the first quadrant for N' possible values respectively by the N' complex rotation operators of said N' complex pre-rotation means (B), said first means further including second means for selecting one of said N' values given by the N' complex pre-rotation means; and third means for applying a supplementary pre-rotation specific to said stage and output means coupled between outputs of said N' complex prerotation means and said second means.

2. A device according to claim 1, wherein each of said N' complex pre-rotation means further comprises:

first delay circuit means responsive to an output of said first rotation operator for delaying said output for N sampling periods;

subtracting means for subtracting data received from said first delay circuit means from data received from said first rotation operator, an output of said subtracting means comprising an output of the complex pre-rotation means.

3. A device according to claim 2, wherein each stage further comprises:

adding means for adding data from said subtracting means to first data;

second delay circuit means responsive to an output $(X'_k{}^{m+1})$ from said adding means, delaying an output of said adding means for a sampling period and then providing said delayed output to said adding means as said first data;

a second complex rotation operator receiving data $(X'_k{}^{m+1})$ from said adding means and subjecting said received data to a complex rotation so as to obtain said component $(X_k{}^{m+1})$.

4. A device according to claim 2, wherein each stage includes fourth means for effecting supplementary pre-rotation and simultaneously adding data from said subtracting means to previously calculated data, said fourth means comprising:

second delay circuit means for receiving first data (X'm+1) from an adder/subtractor, delaying said first data for a sampling period and providing said delayed first data to said adder/subtractor;

a second complex rotation operator receiving said first data (X'm+1) and subjecting said first data to a complex rotation so as to obtain said component (Xm+1).

5. A device according to claim 1, wherein at least one of said complex rotation operators includes four memories, each of said memories receiving a real or an imaginary part of a signal to be subjected to a complex rotation exp.{j.2π.(k/N)}, each of said memories generating a product of said received part of said signal and a real or an imaginary part of an exponential, summing means for adding said products delivered by said memories for forming an output of said at least one complex rotation operator.

6. A radar system including a calculating device according to claim 1, said radar system comprising a radar signal receiving chain, which itself comprises means for matched filtering and a pulse compression system, wherein said means for matched filtering comprises said calculating device.

7. A system according to claim 6, which includes adder means coupled to outputs of said N stages for summing said outputs of said N stages.

8. A system according to claim 6, further including a plurality of adder means, with one input from a given stage and another input from a preceding stage for summing said inputs, at least some of said adder means having an output coupled to a delay device for delaying an adder output for N sampling periods.

9. A system according to claim 6, which includes amplitude weighting means coupled to outputs of said N stages.

10. A system according to claim 6, wherein said calculating device includes fourth means for effecting a complex rotation $$\exp\left\{j \cdot 2\pi \cdot \frac{m+k}{N}\right\}$$

of expression (1) including first post-rotation operation means for effecting a rotation in a first quadrant of a complex plane and supplementary post-rotation operation means for effecting a rotation of a whole number of quadrants;

said first post-rotation operation means comprising N' complex post-rotation means which receive output signals of each of the stages for effecting a rotation in a first quadrant for N' possible values respectively.

* * * * *